(12) United States Patent
Kwon

(10) Patent No.: US 7,216,850 B2
(45) Date of Patent: May 15, 2007

(54) ELECTRIC WIRE CHANGING DEVICE FOR WIRE REPLACING WORKS ON ELECTRIC POLES AND POWER DISTRIBUTING METHOD WITHOUT CUTTING OFF POWER SUPPLY

(75) Inventor: Sae-Won Kwon, Choongchhungbuk-Do (KR)

(73) Assignee: Daewon Electric Co. Ltd., Jinchun-Eup, Jinchun-Gun, Choongchungbuk-Do (KR)

( * ) Notice: Subject to any disclaimer, the term of this patent is extended or adjusted under 35 U.S.C. 154(b) by 123 days.

(21) Appl. No.: 10/480,521

(22) PCT Filed: Jun. 5, 2002

(86) PCT No.: PCT/KR02/01063

§ 371 (c)(1),
(2), (4) Date: Dec. 10, 2003

(87) PCT Pub. No.: WO03/005516

PCT Pub. Date: Jan. 16, 2003

(65) Prior Publication Data

US 2004/0168816 A1    Sep. 2, 2004

(30) Foreign Application Priority Data

Jun. 11, 2001 (KR) ................................ 2001-32587
Jun. 27, 2001 (KR) ................................ 2001-19366

(51) Int. Cl.
*H02G 1/02* (2006.01)
*B66D 3/08* (2006.01)

(52) U.S. Cl. ............................. 254/395; 254/134.3 PA; 248/219.4

(58) Field of Classification Search ............. 248/219.4, 248/218.4, 227.3; 254/134.3 PA, 395
See application file for complete search history.

(56) References Cited

U.S. PATENT DOCUMENTS

| | | | | | |
|---|---|---|---|---|---|
| 2,946,559 | A | * | 7/1960 | Pickett | 254/134.3 PA |
| 3,162,992 | A | * | 12/1964 | Davis et al. | 57/10 |
| 3,545,724 | A | * | 12/1970 | Wright | 254/134.3 PA |
| 3,918,685 | A | * | 11/1975 | Lindsey et al. | 254/134.3 PA |
| 5,064,172 | A | * | 11/1991 | Hereford | 254/134.3 PA |
| 5,533,710 | A | * | 7/1996 | Sauber | 254/134.3 PA |
| 5,573,226 | A | * | 11/1996 | Smith | 254/395 |
| 5,599,005 | A | * | 2/1997 | Sauber | 254/134.3 PA |
| 6,517,052 | B1 | * | 2/2003 | Lake | 254/134.3 PA |

FOREIGN PATENT DOCUMENTS

FR        2593332 A1 *  7/1987

* cited by examiner

*Primary Examiner*—Anita M. King
(74) *Attorney, Agent, or Firm*—GWiPS

(57) ABSTRACT

A device for changing an electric wire and method for distributing power without cutting off power supply has developed for replacing the live electric line on the electric poles, relocating the electric poles and alteration of the power distribution route. Replacement operation of the live electric wire is sequentially performed by connecting new wire and separating old wire by the wire changing device mounted on each electric pole without using bypass cable. The wire changing device comprises a cross-arm fastening unit, wire replacing unit and axial-rotating unit having a central arm fixture, axial shaft, arm coupling and position locking unit. The wire changing method comprises the steps of: mounting the wire changing device on each electric pole, replacing new and old wires without cutting off power supply, arranging the wire space, installing and tightening the new wire on each LP insulator of the electric pole, and removing the separated wire.

5 Claims, 19 Drawing Sheets

ELECTRIC WIRE CHANGING DEVICE FOR WIRE REPLACING WORKS ON ELECTRIC POLES AND POWER DISTRIBUTING METHOD WITHOUT CUTTING OFF POWER SUPPLY

BACKGROUND OF THE INVENTION

1. Field of the Invention

The present invention relates to a device for changing the electric wires and method for distributing power without cutting off power supply during the replacing work of the live electric lines on the electric poles, relocating work of the electric poles and alteration work of the power distribution route. The replacing operation of live electric wires is sequentially carried out by connecting the new wire and separating the old wire by the wire changing device mounted on each electric pole without using a bypass cable.

2. Related Prior Art

With rapid increase of power demand, power facilities to satisfy this demand are being expanded continuously. As the level of user needs for the quality of electricity increases, even an instantaneous service interruption becomes the target of a civil disruption, and electricity users' group activities and judicial cases are being increased. To supply power of good quality during power distribution maintenance, the uninterruptible method is preferred, in which the distribution maintenance is performed in the state where the power is not interrupted.

The previous distribution maintenance procedures using the uninterruptible method include a movable transformer truck type construction method, a bypass cable method and a breaking switch method for construction. In the bypass cable method, one of the temporary power transmission methods, a distribution maintenance is completed by having a cable required for a work area, a construction breaking switch, a movable transformer truck, a hot line bucket truck and a set of pneumatic actuators for hot line work, bypassing the supplied power using a bypass cable on the ground, performing removal and relocation tasks on a distribution line and then removing the bypass cable.

Moreover, in the case where the distribution line has an electric capacity of more than 5,000 KW, since the permissible capacity of a cable in the previous bypass cable method is under 5,000 KW, this wastes a lot of time and labor cost for switching the power load to another distribution line in order to reduce the load of the distribution line to less than 5,000 KW. Because a large capacity distributing method is used commonly, part of the load is switched and only the load of 5,000 KW is put into use uninterruptibly. This results in an insufficient effect of investment money and there occurs a serious problem in effectively operating the distribution network. In addition, it is impossible to construct a distribution line with more than two lines, i.e. upper and lower lines, per one pole by the existing temporary power transmission type interruptible method.

Therefore, for the above-described previous distribution maintenance using the uninterruptible method, a lot of construction workers are required. Also, a large number of temporary connection points of an extra high voltage, which are very dangerous, are made in order to install a bypass cable with a specified length of 50 m. This requires the use of protective equipment for connection failures and connection points. Because installation and removal tasks have to be repeated often, a lot of labor cost is required and the damage to the bypass cable is accelerated, thus threatening safety. If there occurs an accident or unexpected interruption, this costs a great deal, thus making it difficult to secure a good electricity quality. Also, this may cause more civil applications, economic losses and loss of life. Moreover, excessive load switching operations make the functioning of the distribution network unstable and the upper end line of a distribution line with more than two lines cannot be serviced with the uninterruptible method.

SUMMARY OF THE INVENTION

In order to solve the aforementioned problems, an objective of the present invention is to provide a device for changing a live electric wire on the electric poles at electrical working site without cutting off power supply.

A wire changing device comprising: a fastening unit for mounting and tightening the device on a cross-arm of the electric poles, a wire replacing unit for installing and removing the live electric wire and pulling the installed wire to adjust the wire tension, and an axial-rotating unit for perpendicularly mounting and rotating the supporting arm within a preset interval.

Another objective of the present invention is to provide a wire changing device comprising a fastening unit having a pair of the mounting frames formed with a square shape of four flat bar members, an open-able side member for easily inserting and mounting to the cross-arm, and a fastening bolt located at a bottom member for tightening on the cross-arm. The wire replacing unit consists of a supporting arm formed a cylindrical shape of two-stage extendable column, which is made of insulating material. The wire pulling unit has a plurality of rollers with a fully open-able lower member that is mounted at a ton of the supporting arm. An adjusting clamp is mounted adjacent to a step of two-stage extendable column for adjusting its height or length and tightening the column. A pair of eye bolts is disposed opposite sides on the adjusting clamp for connecting the ropes. The axial-rotating unit consists of the central arm fixture formed a flat lateral base at both opposite sides, and the arm coupling for tightly mounting the supporting arm. The axial shaft is integrally attached to the flat lateral base. An axial coupling has an inner spline. A shaft coupling is mounted on the axial shaft. A position locker has an outer spline for mating to the inner spline and an end flange integrally attached to the outer spline for coupling to the axial coupling.

DETAILED DESCRIPTION OF THE PREFERRED EMBODIMENT

Hereinafter, in order to achieve the aforementioned technical objectives, a wire changing device will be described in detail accompanying with the drawings.

Figure 1:
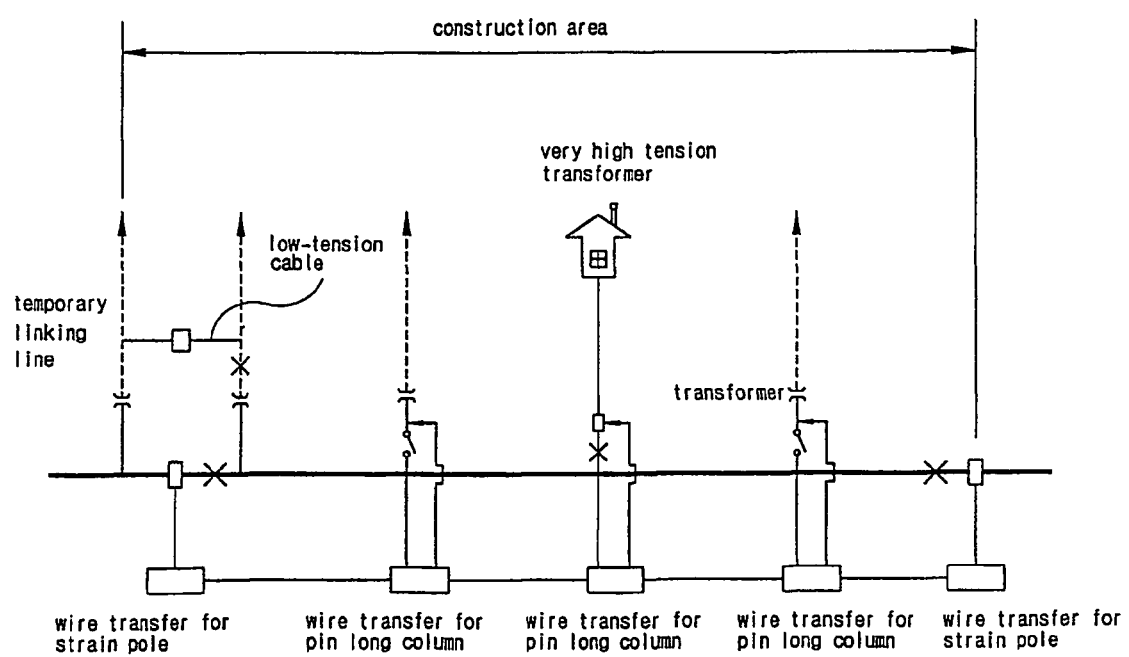
FIG. 1 is a view showing a work state of an uninterruptible deployment method according to the present invention.

As shown in FIG. 1, a wire distribution and deployment at the electrical working site is adopting the uninterruptible method of the present invention. A new concept of technique of wire changing device is employed without using the conventional methods of transportable transformer, the bypassing cable or the break switching.

A device for changing a live electric wire mounted on the electric poles at the working site is used without cutting off power supply. The device is comprising: a fastening unit (10) having a mounting frame for mounting and tightening the device on a cross-arm of the electric pole, a wire replacing unit (20) having a supporting arm for installing and removing the live electric wire and pulling to adjust the wire tension, and an axial-rotating unit (30) having a central arm fixture, an arm coupling and an axial shaft for perpendicularly mounting and rotating the supporting arm within a preset interval.

Figure 2:
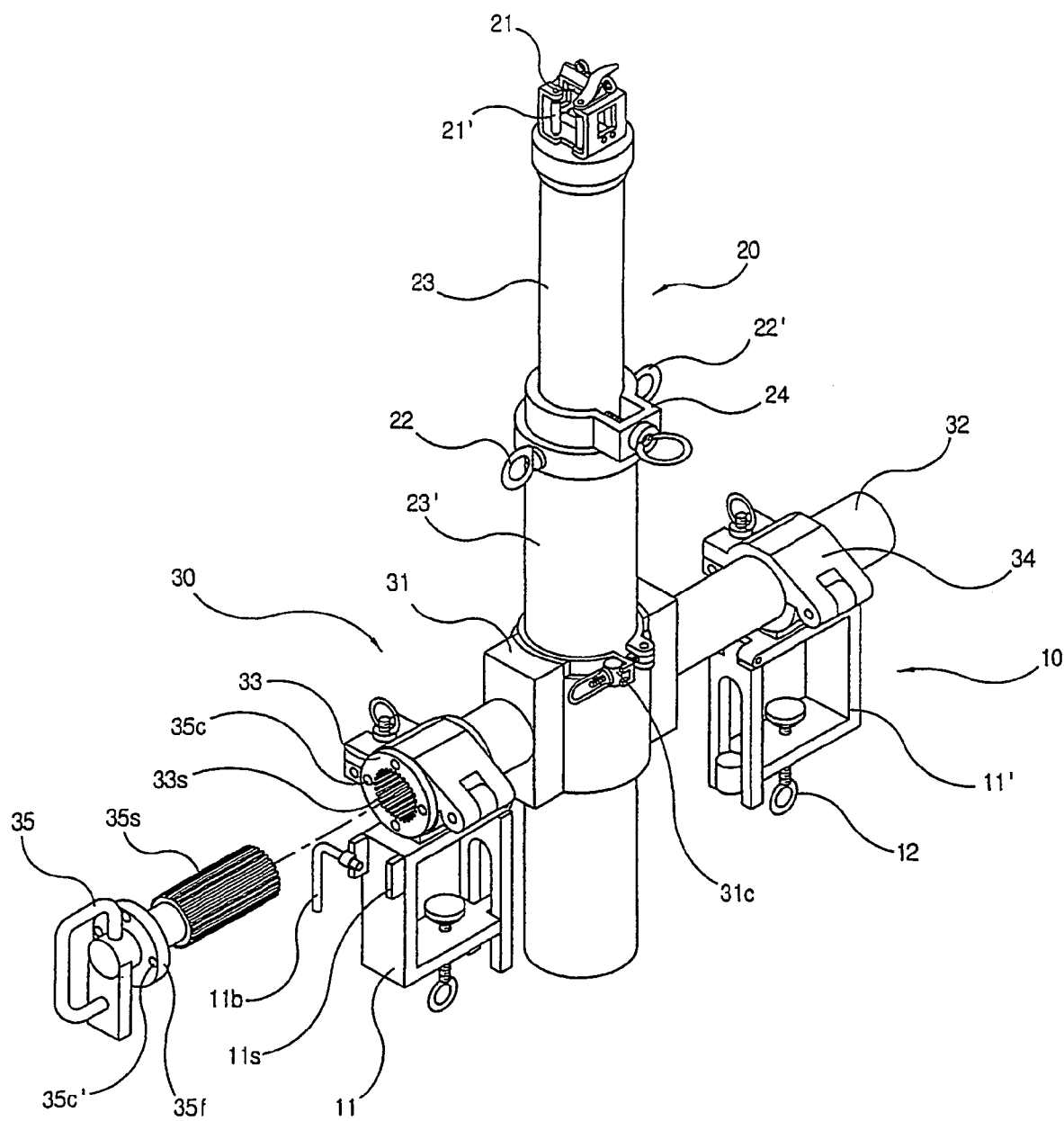
FIG. 2 is a view illustrating a wire transfer mechanism for terminal poles and strain poles according to one embodiment of the present invention.

As shown in FIG. 2, a wire changing device is used for a terminal pole and strain pole where the suspension insulators are mounted. The device for changing a live electric wire used at electrical working site comprises a fastening unit (10) having a pair of the mounting frames (11, 11') formed with a square shape of four flat bar members, an open-able side member for easily inserting and mounting to the cross-arm, and a fastening bolt (12) located at a bottom member for tightening on the cross-arm.

The wire replacing unit (20) consists of the supporting arm (23, 23') formed a cylindrical shape of two-stage extendable column and made of insulating material. A wire pulling unit has a plurality of rollers (21, 21') with a fully open-able lower member that is mounted at a top of the supporting arm. An adjusting clamp (24) is mounted adjacent to a step of two-stage extendable column for adjusting the height or length and tightening the column. A pair of eye bolts (22, 22') is disposed opposite sides on the adjusting clamp (24) for connecting ropes.

The axial-rotating unit (30) consists the central arm fixture (31) formed a flat lateral base at both opposite sides. An arm coupling (31c) is used for tightly mounting the supporting arm. The axial shaft (32) is integrally attached to the flat lateral base. An axial coupling (33) has an inner spline (33s). A shaft coupling (34) is mounted on the axial shaft (32). A position locker (35) has an outer spline (35s) for mating to the inner spline (33s), and an end flange (35f) integrally attached to the outer spline (35s) for coupling to the axial coupling (33).

Figure 3:
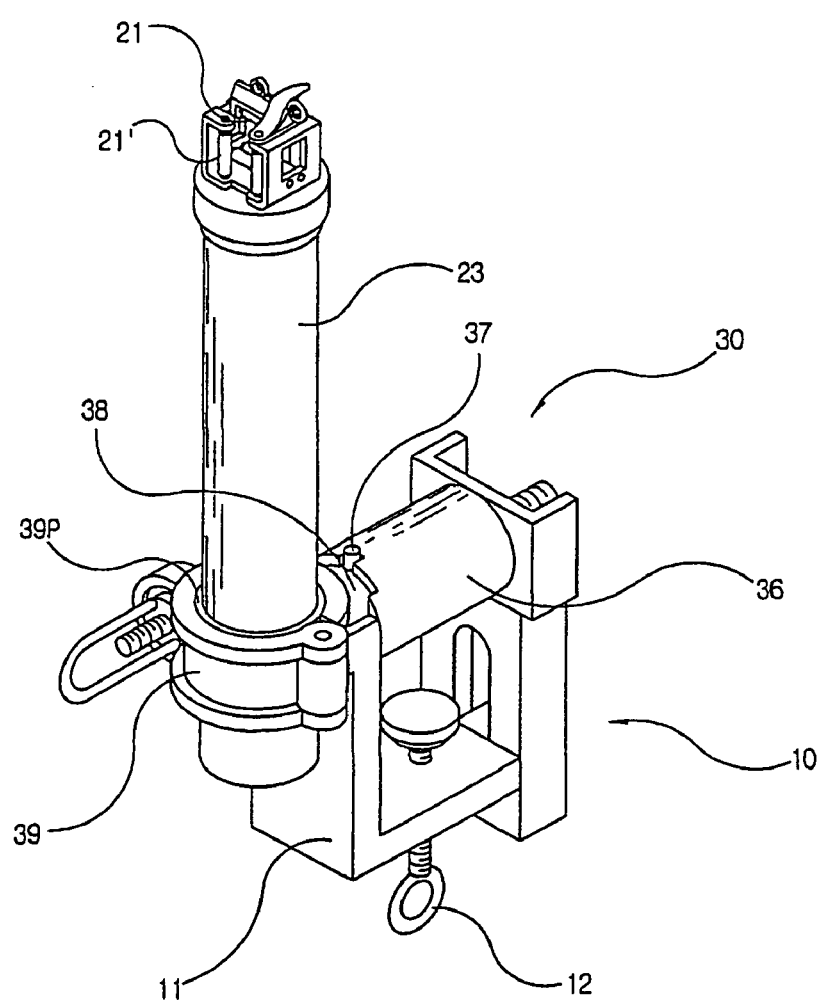
FIG. 3 is a view illustrating a wire transfer mechanism for pin long columns according to another embodiment of the present invention.

As shown in FIG. 3, another embodiment of the wire changing device of the present invention is used for the long pin columns.

The device for changing a live electric wire comprises that the fastening unit (10) consisting of the mounting frame (11) formed a U-shape of three flat bar members integrally attached to a top member of a cylindrical tube (36), an open-able side member for easily inserting and mounting to the cross-arm, a fastening bolt (12) located at a bottom member for tightening on the cross-arm.

The wire replacing unit (20) consists of the supporting arm (23) formed a cylindrical shape column made of insulating material, the wire pulling unit having a plurality of rollers (21, 21') with a fully open-able lower member that is mounted at a top of the supporting arm (23).

The axial-rotating unit (30) consists of the central arm fixture integrally attached to a front member of the mounting frame (11), a stopper (37) activated by a resilient force of a spring to limit the rotation of the supporting arm (23), an axial shaft (38) disposed inside of the cylindrical tube (36), the arm coupling (39) for tightly mounting the supporting arm (23) and an insulating sealant (39p).

Figure 4:
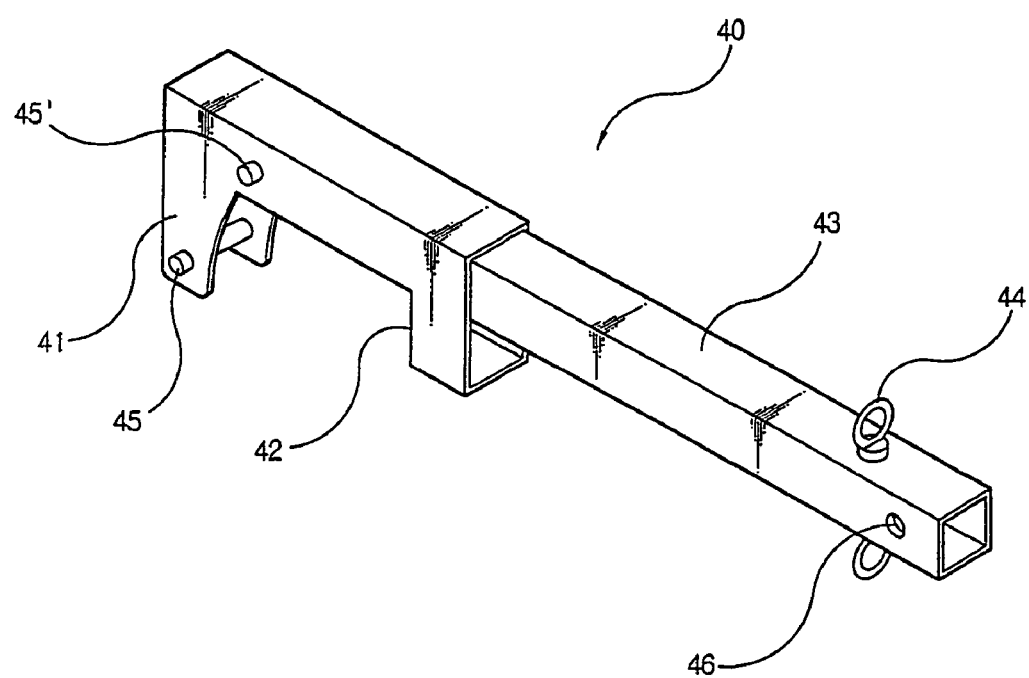
FIG. 4 a view illustrating a wire transfer mechanism for cross arm extensions according to still another embodiment of the present invention.

As shown in FIG. 4, an extension unit (40) is used for mounting the wire changing device on an extended arm for operating the wires located at no margin of the cross-arm.

The extension unit (40) comprises a mounting bracket (41) for attaching to push into a mid of the cross-arm, a mounting foot (42) for sliding into a proximal end of the cross-arm, a pair of bracket pins (45, 45') for securing the attachment to the cross-arm, an extension arm (43) made of insulating material for sliding and inserting into a mounting bracket base and a pair of ring bolts (44) for hooking chains or ropes.

Figure 5:
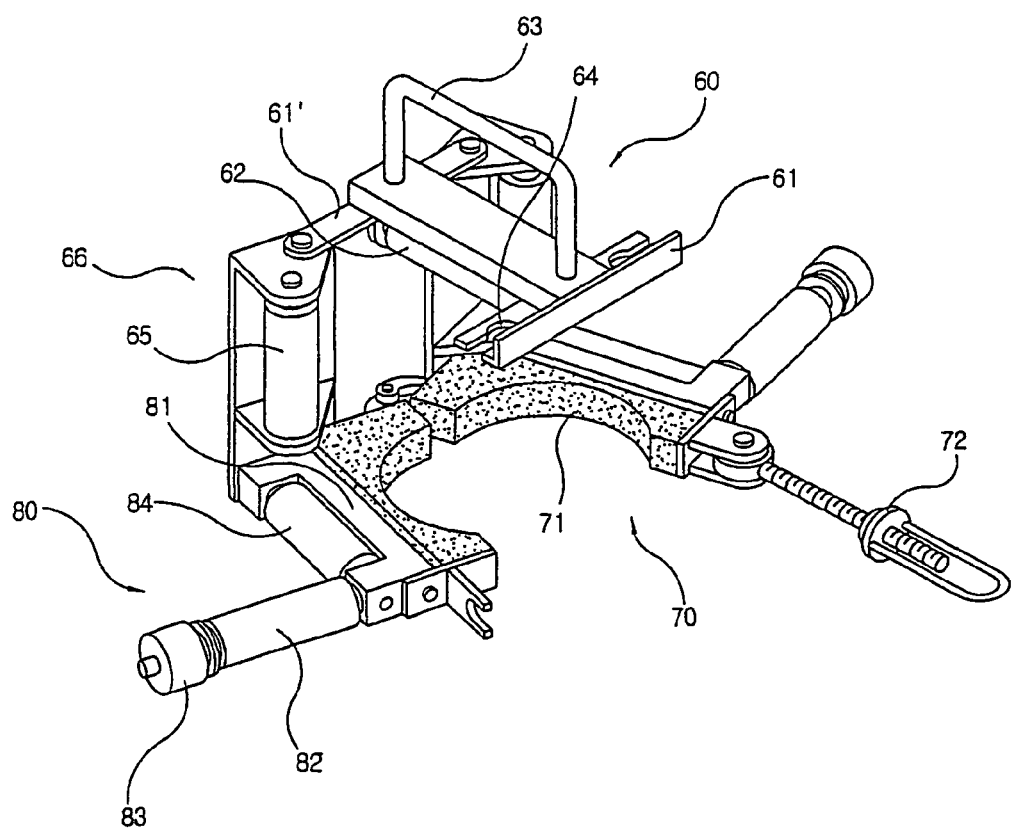
FIG. 5 is a view illustrating a wire transfer mechanism for an LP insulator according to still another embodiment of the present invention.

FIG. 5 is a view illustrating a wire transfer mechanism for an LP insulator according to still another embodiment of the present invention.

The wire transfer mechanism includes: an upper supporting means 60 having front and rear supporting brackets 61 and 61', an upper roller 62 rotationally mounted on the lower portion thereof with brackets, and a handle 63 fixed to the upper portion thereof; a vertical supporting means 66 being rotationally and axially mounted to the rear supporting bracket 61' at right angles and having a longitudinal roller 65 in the same direction; an insulator coupling means 70 having a pad 71 with a semicircular inner circumferential surface to be rotated coaxially with the vertical supporting means 66 and coupled to the upper portion of an insulator and a screw-type clamp 72; and an open-and-shut means 80 having an L-shaped roller supporting bar 81 axially mounted in a horizontal direction to an outer side of the insulator coupling means 70, a longitudinal roller 82 to be inserted into a coupling groove 64 of the front supporting bracket 61 by a locking unit 83 with a spring at the front end and a lower roller 84 which protrudes farther upward than the upper surface of the pad 71.

Figure 6:
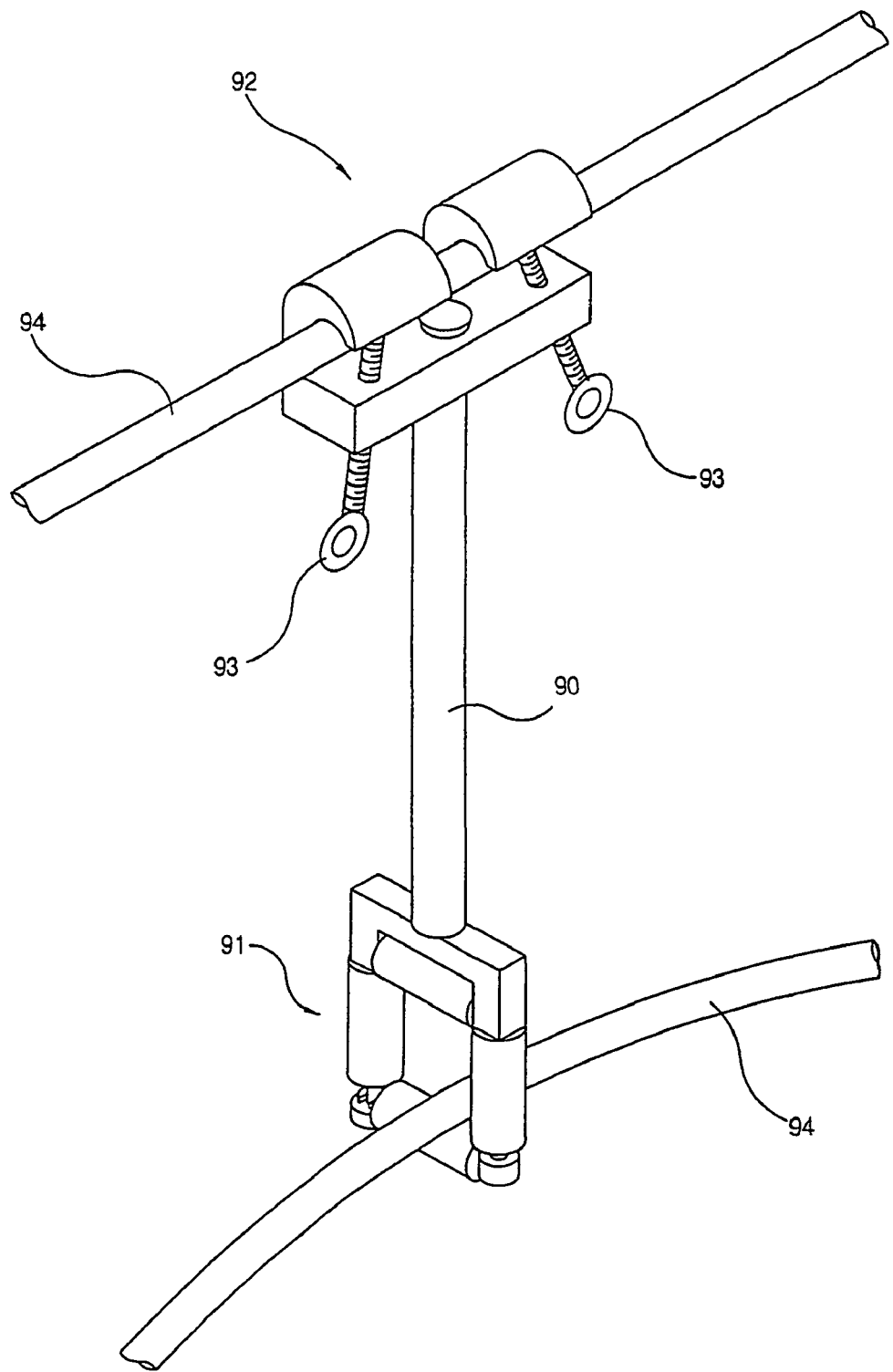
FIG. 6 is a view illustrating a wire space maintainer according to the present invention.

FIG. 6 is a view illustrating an embodiment of a space maintaining mechanism between new and removed wires according to the present invention.

The space maintaining mechanism includes a vertical spacing bar 90, an open-type stranding roller 91 formed at one end of the spacing bar 90, a wire clamp 92 formed at one end of the spacing bar 90, and a plastic bolt 93 for fixing a wire 94 against the clamp 92.

An uninterruptible deployment method of the present invention using the wire transfer mechanism will now be explained by steps.

As illustrated in FIG. 1, the deployment method includes the steps of: mounting wire transfer mechanisms for terminal poles, strain poles and pin long columns respectively to a cross arm of terminal poles, strain poles and pin long columns; transferring a removed wire to other spaces of a cross arm and cross arm extension means and securing a mounting space of replaced and transferred wires; protecting the hot line of a transferred wire and mounting a wire transfer mechanism to an LP insulator of a pin long column; mounting a new wire by performing stranding and pulling tasks of the new wire to a hot line protected and secured wire mounting space and the stranding mechanism mounted to the upper portion of the LP insulator; maintaining a wire with a space maintainer for securing safety by preventing contact between a new wire and a removed wire in a wire stranding task; separating electricity from the removed wire with the uninterruptible electricity method by connecting between a new wire and the removed wire and then bypassing it; and removing the electricity-separated wire.

At this time, like the case that no wire stranding step is required for a mounted pole, for example, changing of passing area, unnecessary steps can be omitted.

Such a step will be explained in detail according to an embodiment of the present invention.

In the step of mounting a wire transfer mechanism, the wire transfer mechanism is mounted according to the specific shape of the long column of each pole.

For example, at terminal poles and strain poles with a suspension insulator 2 connected with a wire, a wire transfer mechanism for terminal poles and strain poles as shown in FIG. 2 is fixed by a clamping bolt 12 by inserting the supporting plates 11 and 11' of the cross arm fixing means 10 into the cross arm 1.

The axial bar 32 and the axial pipe 33 supported by the clamp 34 are rotated with the center at an axial point when adjusting an angle required for a task by rotating in the other direction by the axial rotating means 30, and thereafter a position fixture 35 with a spline 35s and a flange 35f is fitted and engaged with an axial pipe spline 33s formed at an inner surface of the axial pipe 33, and the length (height) adjust of the upper and lower arm bodies 23 and 23' is carried out by fixing the lower arm body 23' by an arm fixing clamp 31c and fixing the upper arm body 23' by an arm fixing clamp 31c.

In a pin long column that is mounted on the middle of a terminal pole and a strain pole and allows wires to be passed over an LP insulator 3 mounted to a cross arm 1, a wire transfer mechanism for a pin long column as shown in FIG. 3 is fixed at a cross arm by a supporting plate 11, a cross arm fixing means 10, and a clamping bolt 12.

Moreover, if there is a need for mounting the above wire transfer mechanism outside of a cross arm according to the location of wires and working conditions, a cross arm extension means 40 as shown in FIG. 4 is coupled to one end portion of the cross arm by the supporting plate 41 for the cross arm, an insert end 42 and cross arm fixing pins 45 and 45' to make the wire transfer mechanism protrude beyond the end of the cross arm 1 of the extension arm 43 and thereby mount the wire transfer mechanism. This enables safe and convenient work by securing a wire mounting space.

Figure 7A:
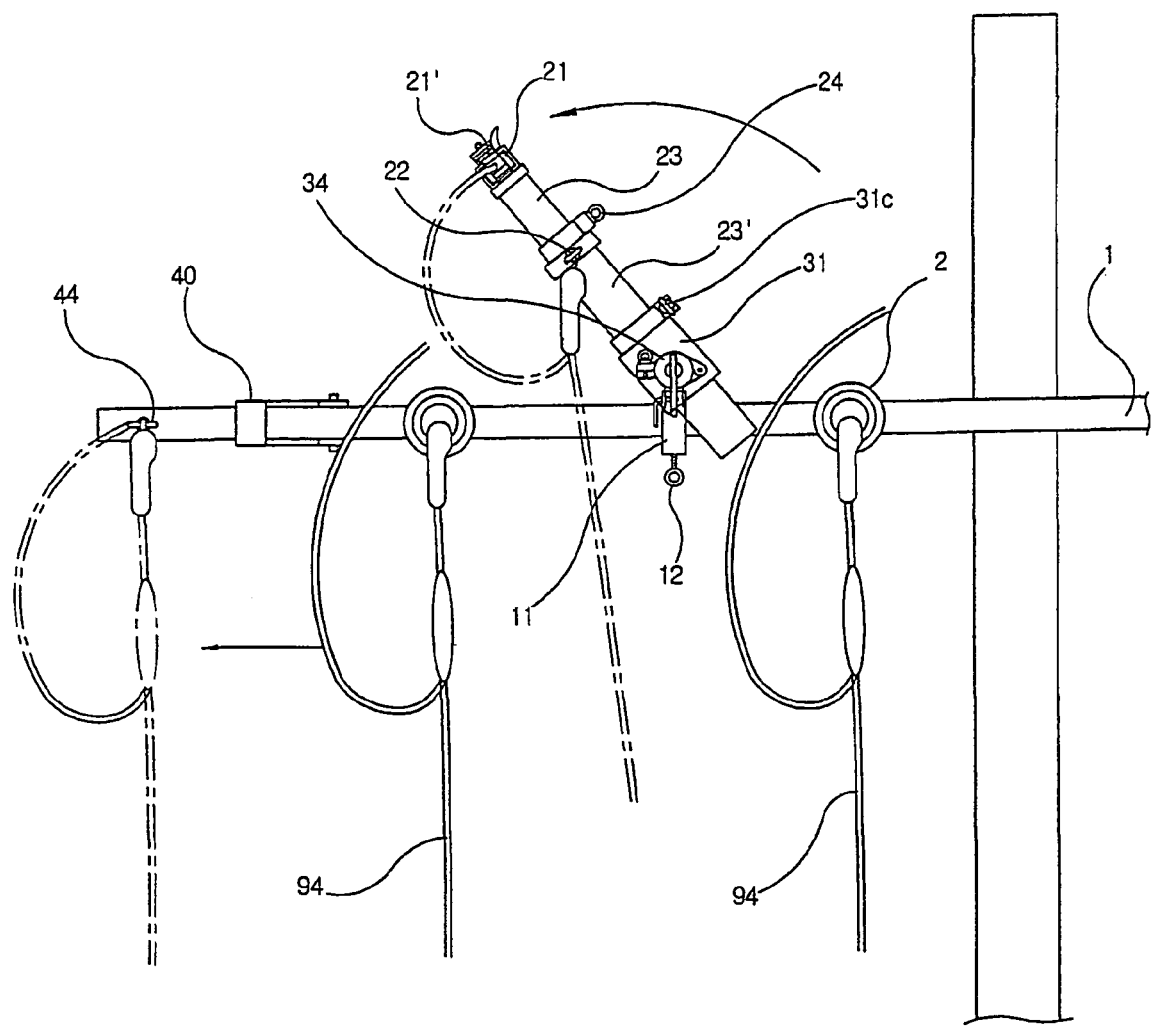
FIG. 7a is a view illustrating a wire transferring of a suspension insulator according to the present invention.

In the wire transfer step performed after the wire transfer mechanism is mounted, a wire to be removed by releasing a dead-end clamp from a suspension insulator of terminal poles and strain poles is transferred by hanging a hot line wire grip on rings 22 and 22' for the hot line wire grip, and a jumper wire is fitted to insulation stranding rollers 21 and 21' and then is fixed in the state where a wire to be removed and transferred is moved to the other location as shown in FIG. 7a.

At this time, the axial bar 32 and the clamp 34 can be fixed to and separated from each other and thus the location thereof can be changed. The lateral length adjustment is enabled and applicable even if there is a little difference in the width of a cross arm. According to the distance between the axial rotating means 30 and the existing suspension insulator 2, the length adjustment of two arm bodies 23 and 23' is possible by moving the insertion length of the two arm bodies 23 and 23' and then fixing them by a jumper arm fixing clamp 24 and an arm fixing clamp 31c formed at the arm body of the rotary arm means.

Figure 7B:
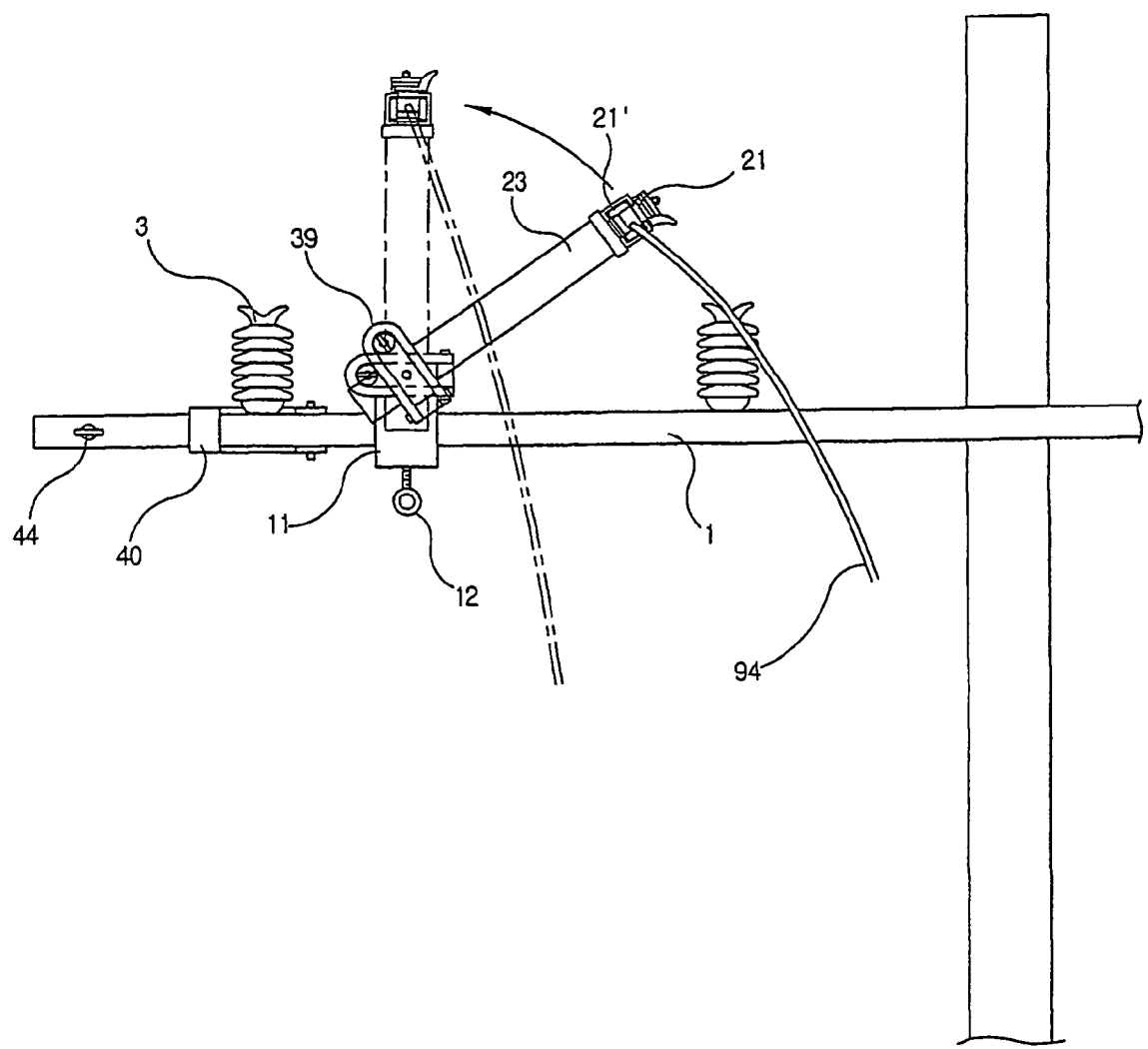
FIG. 7b is a view illustrating a wire transferring of an LP insulator according to the present invention.

In the case of pin long columns, as shown in FIG. 7b, wires are contained in rollers 21 and 21' by the developable roller 21 at the upper end of the arm body 23' of the wire transfer mechanism fixed at the sides of the LP insulator, and then the bind of the LP insulator is released and the axial rotating means 30 is rotated in the other direction. Then, the wire placed on the LP insulator is moved to the other side, thereby creating a mounting space for a new wire.

In addition, since the center wire among three wires mounted on a single pole has a narrow workspace, it is necessary to move external wires to the outside of the cross arm to secure a workspace.

Figure 7C:
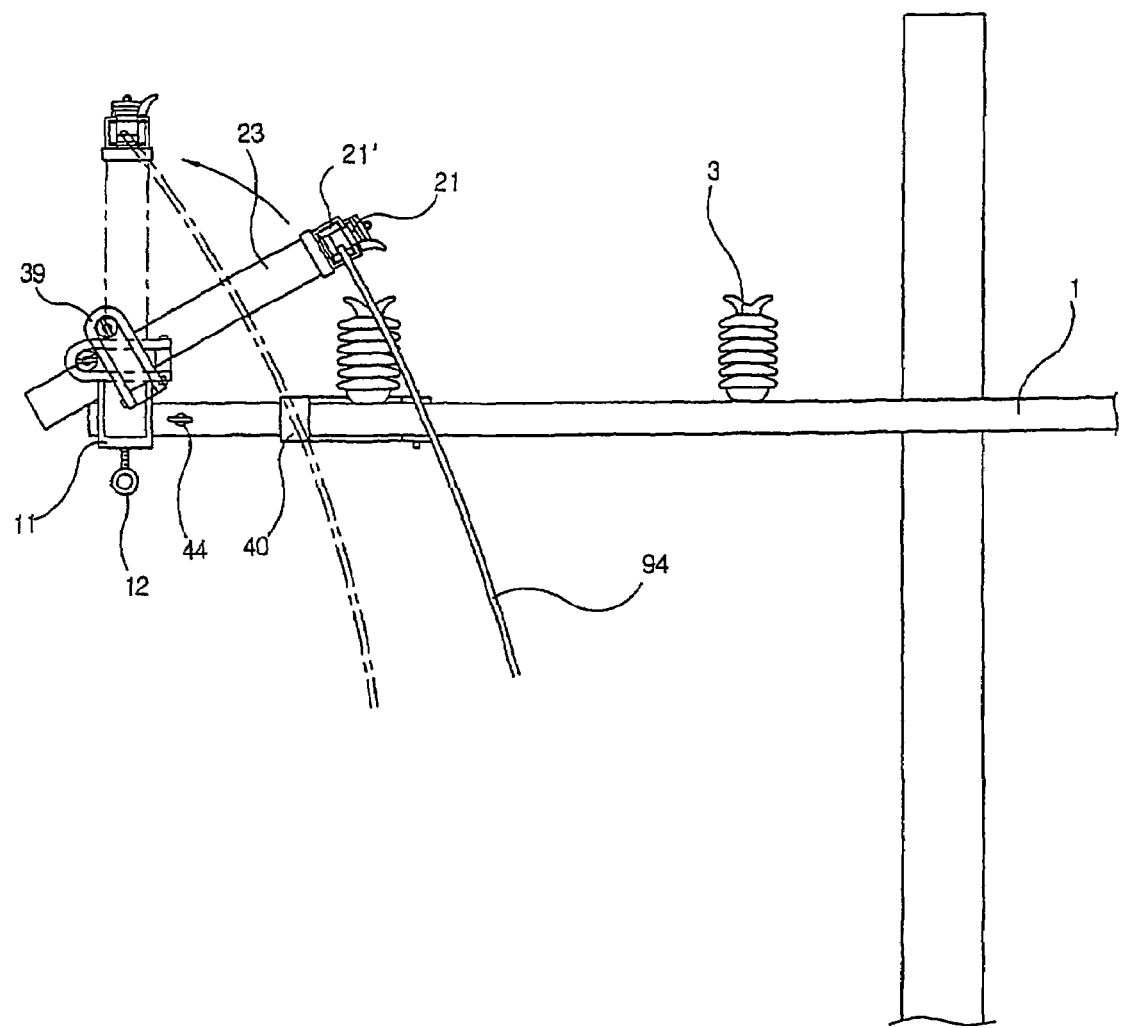
FIG. 7c is a view illustrating a wire transferring by an auxiliary arm according to the present invention.

At this time, as shown in FIG. 7c, the cross arm extension means 40 is coupled to the end of the cross arm by the supporting plate 41 and the insert end 42 to make the extension arm 43 protrude beyond the end of the cross arm. Thereafter, the wire transfer means is mounted in the same way as that of the cross arm, and then the wire at the outer side can be moved beyond the end of the cross arm in the same way.

As described above, after the wire transfer, a hot line protection cover is placed onto a removed wire which remains hot. If there is a branch line or electric transformer at a working area, a wire to be removed is transferred by a bypass using a bypass cable for a jumper or a bypass cable for C.O.S and the hot line protection cover is mounted.

After the completion of the hot line protection step, a new wire is mounted at a wire mounting space that is secured by transferring a wire and located at the upper portion of an LP insulator of a pin long column using a wire stranding mechanism, a safety rope and distribution tensioner, winch, etc.

When installing the wire stranding mechanism to the LP insulator, the wire stranding roller can be coupled firmly to the upper portion of the LP insulator by expanding the pad 71, an insulator coupling means 70 at the lower portion, with a center of the rear axial point, inserting it into an upper groove of the LP insulator, folding the pad 71 again and clamping the clamp 72 at the front surface. Since the pad 71 is made of flexible plastic material, a kind of insulating material, it can cut off the current of a wire and prevent the damage of the LP insulator when it is coupled.

Figure 7D:
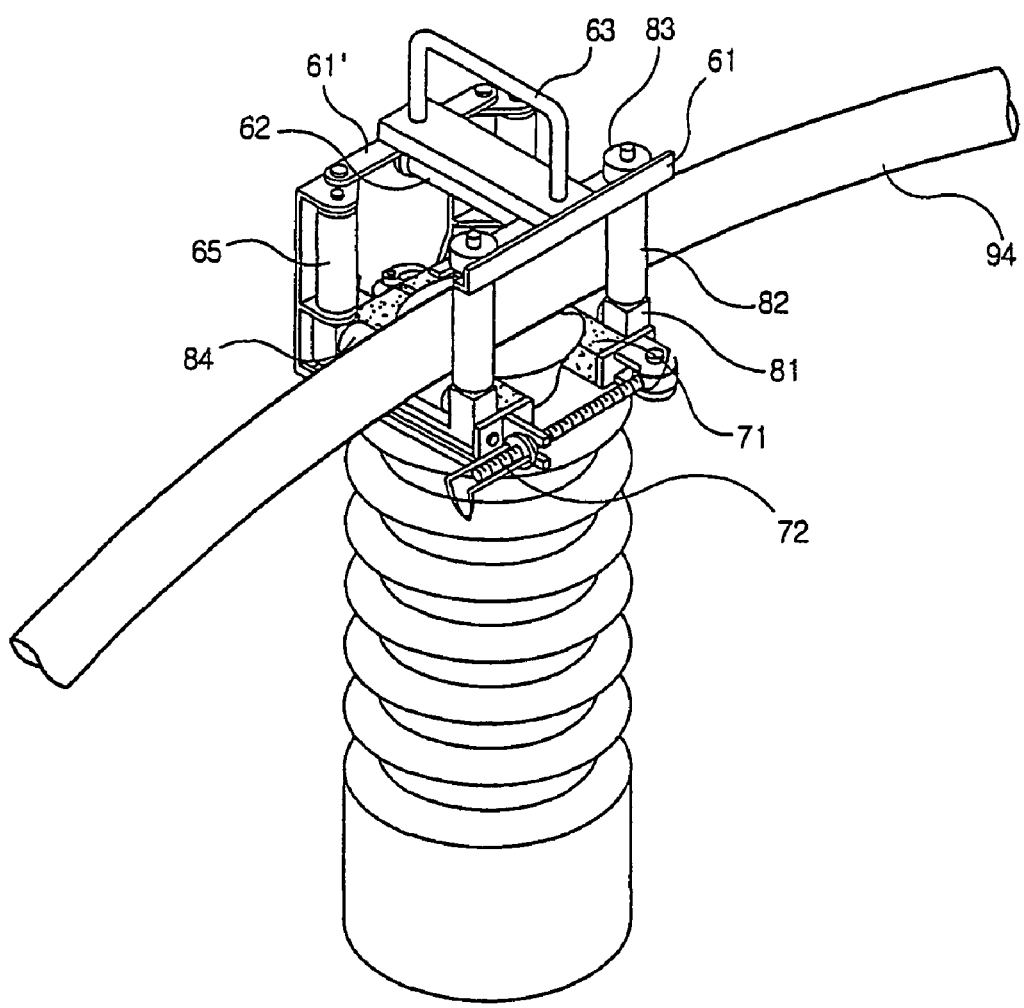
FIG. 7d is a view illustrating a wire stranding by a wire stranding mechanism.

In this way, with respect to the wire stranding roller installed at the upper portion of the LP insulator, firstly, an L-shaped roller supporting bar 81, the open-and-shut means 80, is expanded bilaterally, to thus make an inner space open. In this state, a wire to be installed is inserted into the wire stranding roller and is coupled to the upper portion of the LP insulator by the insulator coupling means 70. Then, the upper portion of the longitudinal roller 82 is inserted into the coupling groove 64 of the front supporting bracket 61 by rotating the L-shaped roller supporting bar 81 inwardly, and thus locking is supported by the spring force. Therefore, as shown in FIG. 7d, a wire is confined between rollers. At the same time, the lower roller 84 of the L-shaped roller supporting bar 81 rotates around the axial point and protrudes upward, thereby raising the wire 94 upwards like a lever.

Therefore, as the wire is separated from the LP insulator, it is contacted by the roller to make it move freely and smoothly. Thus, when the wire is moved for wire stranding and pulling tasks, this becomes convenient and easy and prevents the damage of cables or insulator surfaces.

During the stranding work, since the tension in a wire has not been controlled, the gap between new and old wires is non-uniform. Thus, in each area with a narrow gap and danger of short circuit, a wire clamp 92 is hung over old wires, clamped and fixed by a wire space maintainer as shown in FIG. 6 and new wires are fitted into the stranding roller 91 to allow a wire space as long as a space bar 90, thus enabling safe work.

In this way, a wire is fixed to a dead-end clamp of each suspension insulator by carrying out a pulling operation for pulling a stranded wire from the suspension insulator by an appropriate tensile force. The wire stranding mechanism is removed from the LP insulator of a pin long column and is bound again, thereby completing the wire mounting process.

In this way, after completing the mounting of a new wire, a removed wire in a hot line state and the new wire are connected with each other by a bypass. Then, if there is a branch line or transformer mounted between the new and the removed wires, this is connected to the new wire to supply power uninterruptibly and eliminate a jumper bypass cable and a COS bypass cable.

In this way, after the preparatory work is finished, the uninterruptible electricity separation process for separating a wire to be removed completely from the power source and interrupting electricity is carried out.

Figure 8:
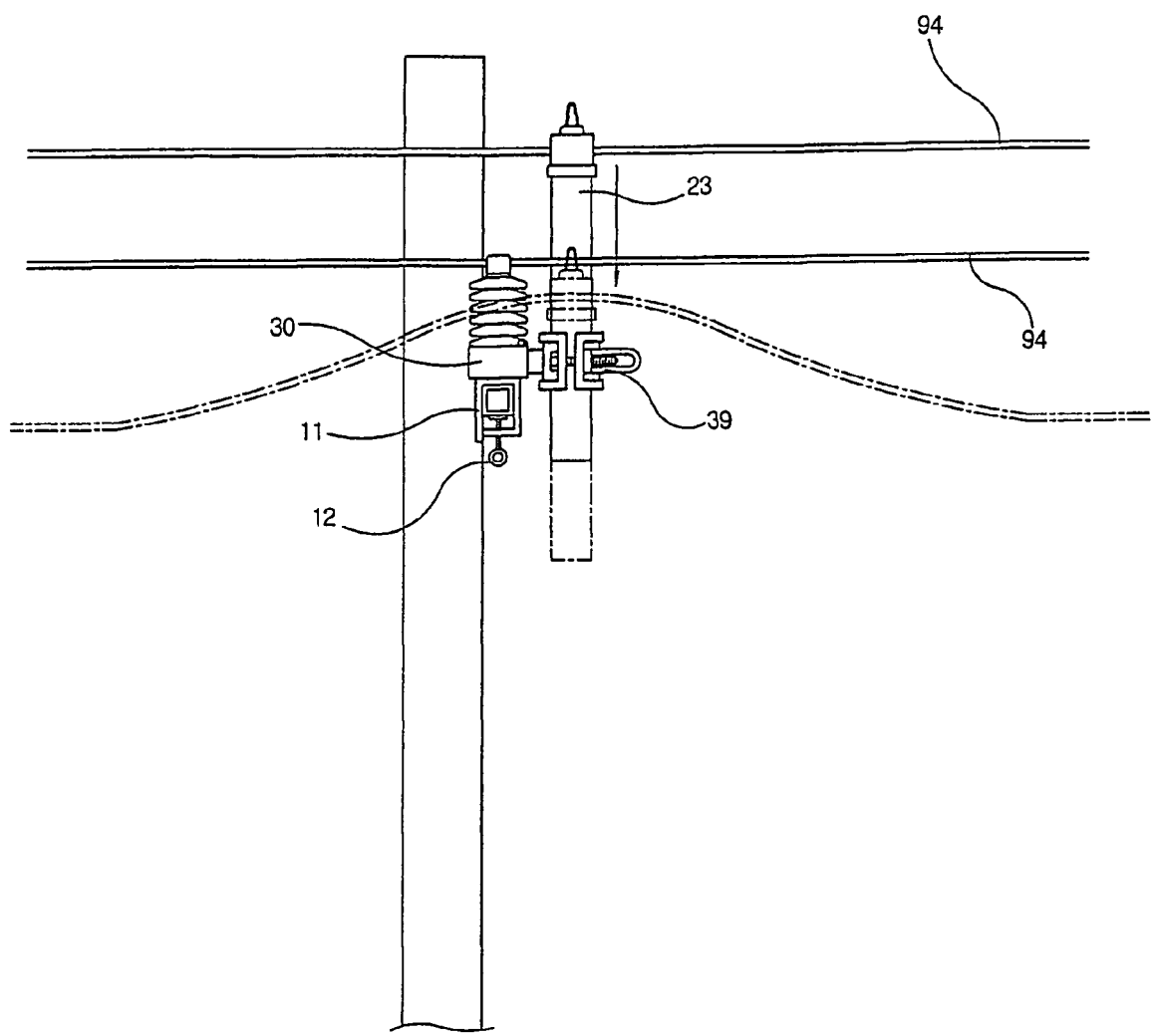
FIG. 8 is a view illustrating a wire relaxing of a wire transfer mechanism according to the present invention.

Because the wire from which electricity is separated is not live, safe work is enabled. As illustrated in FIG. 8, the arm body 23 of the wire transfer mechanism is lowered by releasing the clamp 24, thereby relieving the tension in the wire. Then, it is possible to remove the wire safely and easily by a safety rope and a tensioner for distribution at a position lower than the new wire in the hot line state.

After the wire removal is finished, wire transfer mechanisms mounted on poles are removed, thereby finishing the operations of removal and relocation of wires connected and distributed to each pole and changing of passing area.

In addition, in a maintenance operation including cross arm replacement, a separated auxiliary cross arm is laid on poles. Then, a wire is directly transferred or the wire transfer mechanism and wire stranding mechanism are installed for transferring wires. By this means, when it is difficult to mount the wire transfer mechanism on the cross arm during the operation or when it is required to replace the cross arm along with the replacement and relocation of new and old wires, there is no fixture for mounting the above wire transfer mechanism and stranding mechanism or transferred wire, thus enabling the relocation of the wire.

Figure 9:
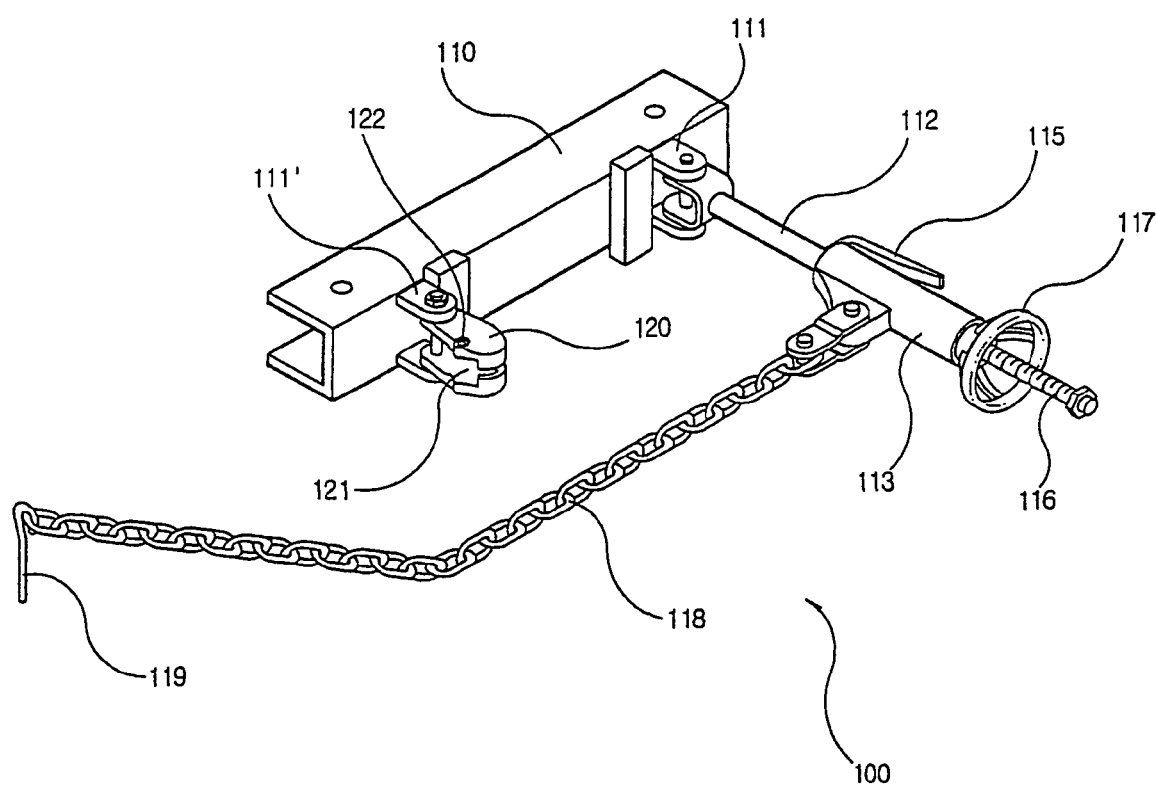
FIG. 9 is a view illustrating an auxiliary cross arm fixing device according to the present invention.

As shown in FIG. 9, an auxiliary unit (100) comprises a pair of supporting brackets (111, 111') mounted at both proximal ends of a channel (110) a connecting rod (112) axially coupled to the supporting bracket (111) at one side channel, a clamp hosing (113) having a side bracket to connect a chain (118), a threaded portion (116) of the connecting rod (112) inserted into the clamp hosing (113), a locking controller (115) disposed opposite side of the side bracket elastically latched the threaded portion (116) for maintaining a working position by a spring, and a thread wheel (117) for adjusting the working position, a latch (120) having a safety locker (121) and a safety pin hole (122) disposed at the other proximal end of the channel to tighten around the electric pole.

Figure 10:
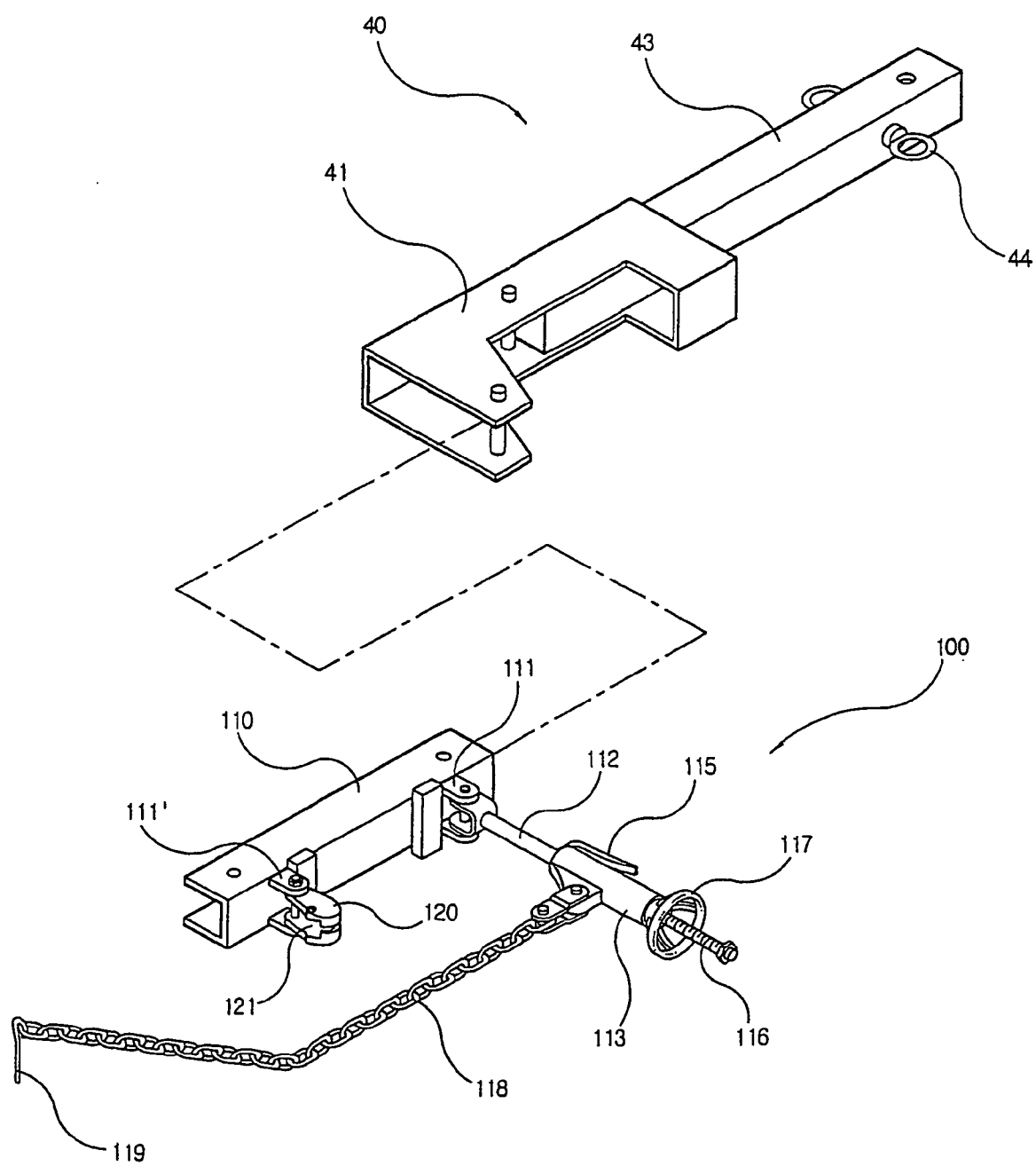
FIG. 10 is a view illustrating the connection of an auxiliary cross arm for a pin long column with respect to the auxiliary cross arm fixing device according to the present invention.

As shown in FIG. 10, the extension unit (40) is possibly mounted on the auxiliary unit (100) to extend the working space or distance. Each proximal end of the channel (110) is inserted into the mounting bracket (41) and mounting foot (42) respectively. Then, the pin is locked for securing the attachment.

Figure 11:
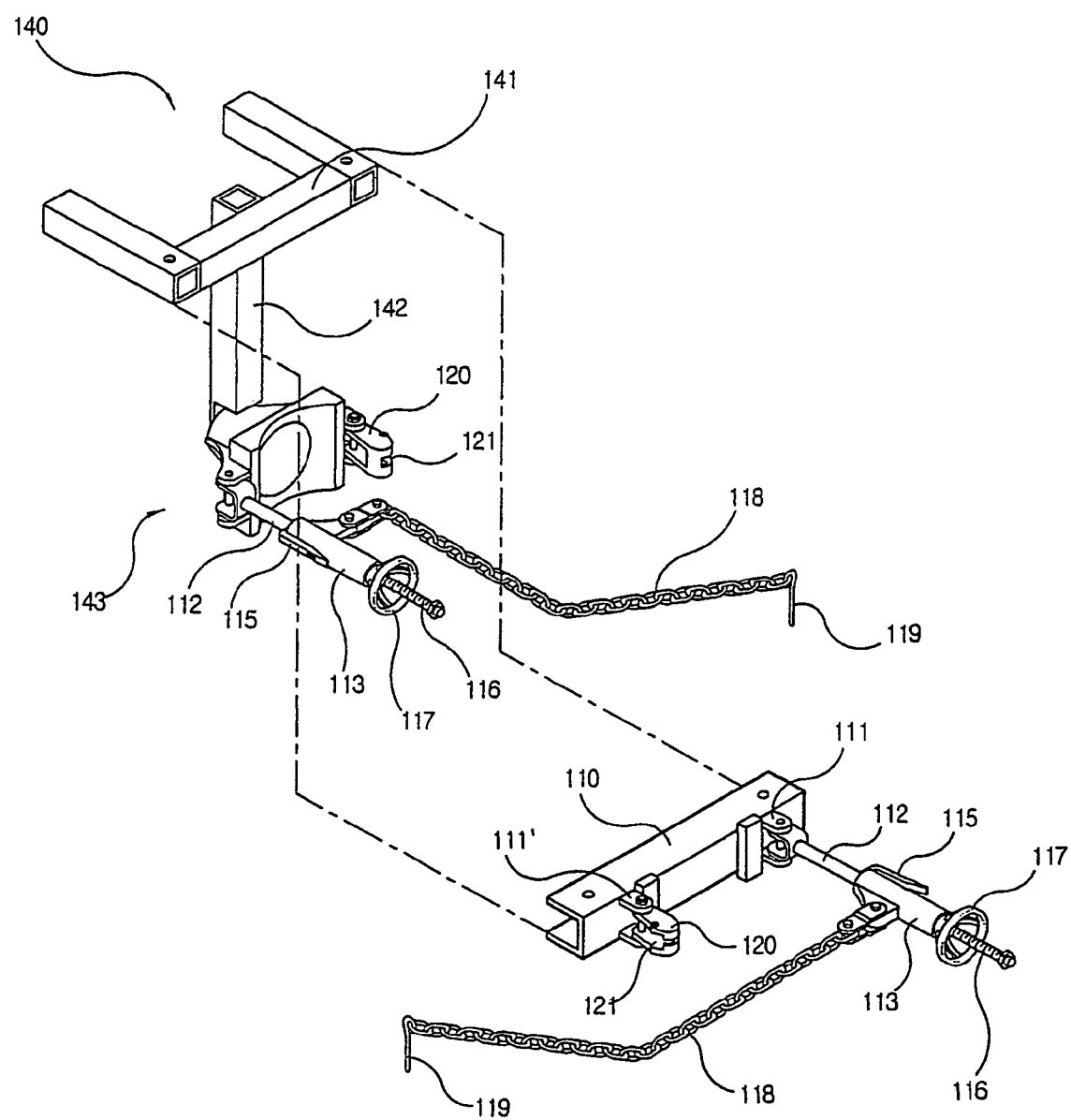
FIG. 11 is a view illustrating the connection of an auxiliary cross arm for terminal poles and strain poles with respect to the auxiliary cross arm fixing device according to the present invention.

FIG. 11 is a view of an embodiment for coupling an auxiliary cross arm used for terminal poles and strain poles with respect to an auxiliary cross arm fixing device of the present invention.

At ⊏-shaped supporting arm 141 and the lower portion of a vertical support 142 at the center, an auxiliary cross arm 140 for terminal poles and strain poles, which is formed as the above-mentioned supporting means, that is, the auxiliary supporting means 143 having a clamp tub 113 elastically mounted with a connecting rod 112 and the spring 114, the screw bar 116, the clamp 117, the chain 118 and the hanger 120, is coupled to the beam 110.

In addition, when relocating a wire to replace the wire mounted at the suspension insulator or LP insulator of the cross arm of terminal poles, strain poles and pin long columns by the uninterruptible electricity method, the wire transfer mechanism is mounted to the cross arm, the existing wire is moved to another place and a new wire is mounted thereon. If it is difficult to mount the wire transfer mechanism due to the condition of the cross arm, or if there is a need for replacing the cross arm itself, the wire has to be transferred to another place or the wire transfer mechanism has to be attached to a separate place.

Therefore, the problems of the auxiliary cross arm 100 according to the present invention can be solved by directly mounting the hanger to poles. Firstly, the beam 110 is located at a proper position. Then, the chain 118 coupled to the clamp tub 113 axially mounted at the axial mounting portion 111 at one end is fitted and fixed to the chain hanging groove 121 of the hanger 120, and the safety pin 119 of the front end is inserted into the pin insert hole 122, thus enabling the engagement of the chain 118.

Figure 14A:
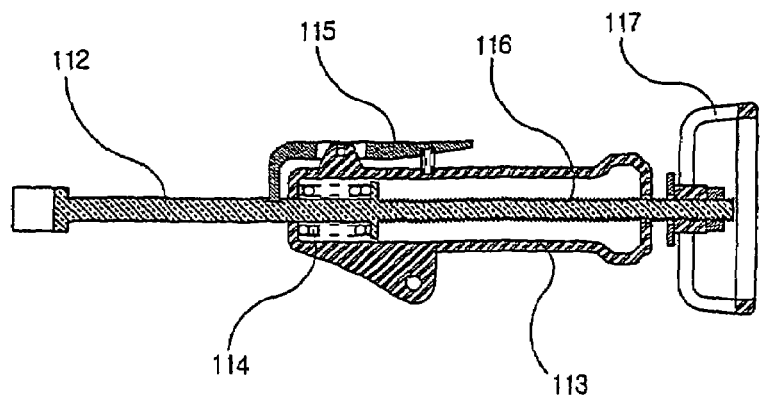
FIG. 14a is a view illustrating the operation of a clamping tub of a clamping means according to the present invention when it is in the backward state.

At this time, as shown in FIG. 14a, the clamp tub 113 screwed with the supporting bar 112 is in the backward state near the clamp 117 while compressing the spring 114.

Figure 14B:
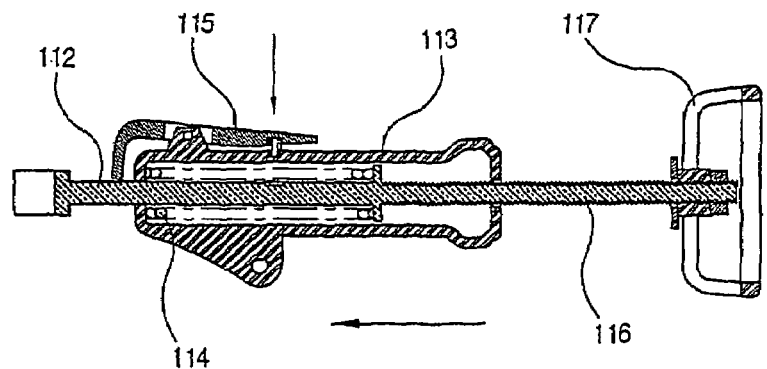
FIG. 14b is a view illustrating the operation of the clamping tub of the clamping means according to the present invention when it is in the first forward state.

When the locking device 115 of the clamp tub 113 is pressed and released, as shown in FIG. 14b, the clamp tub 113 is pushed forward firstly by the elastic force of the compressed spring 114, thereby pulling the chain 18 and thus bringing the chain 118 into contact with the surface of a pole.

Figure 14C:
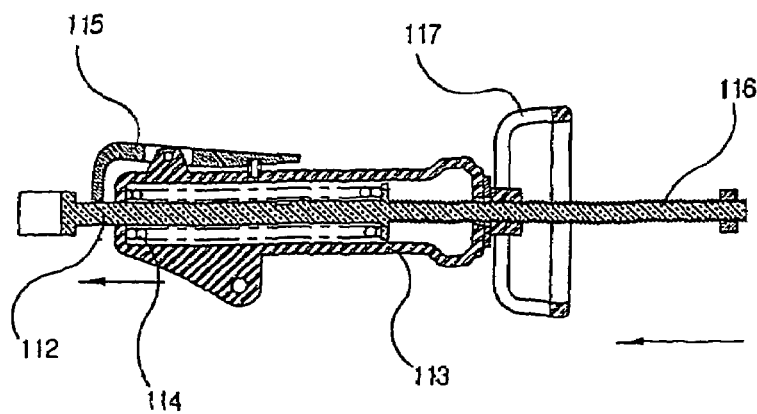
FIG. 14c is a view illustrating the operation of the clamping tub of the clamping means according to the present invention when it is in the second forward state.
Figure 15:
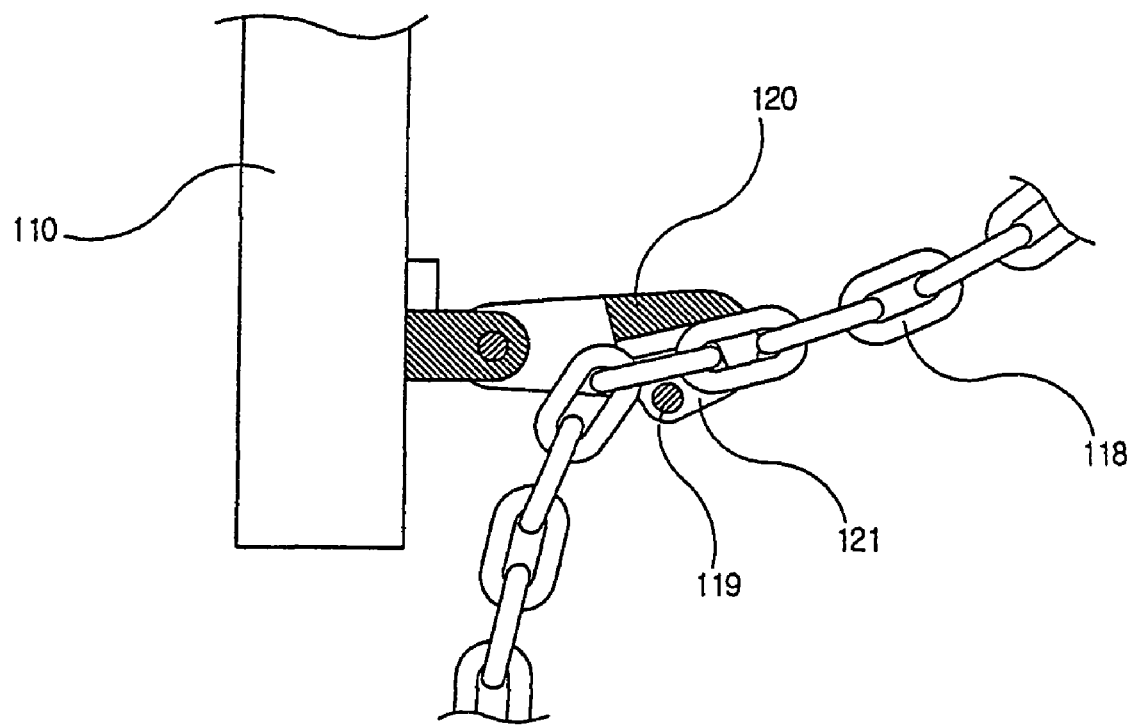
FIG. 15 is a detailed view illustrating an auxiliary cross arm fixture according to the present invention.
Figure 16:
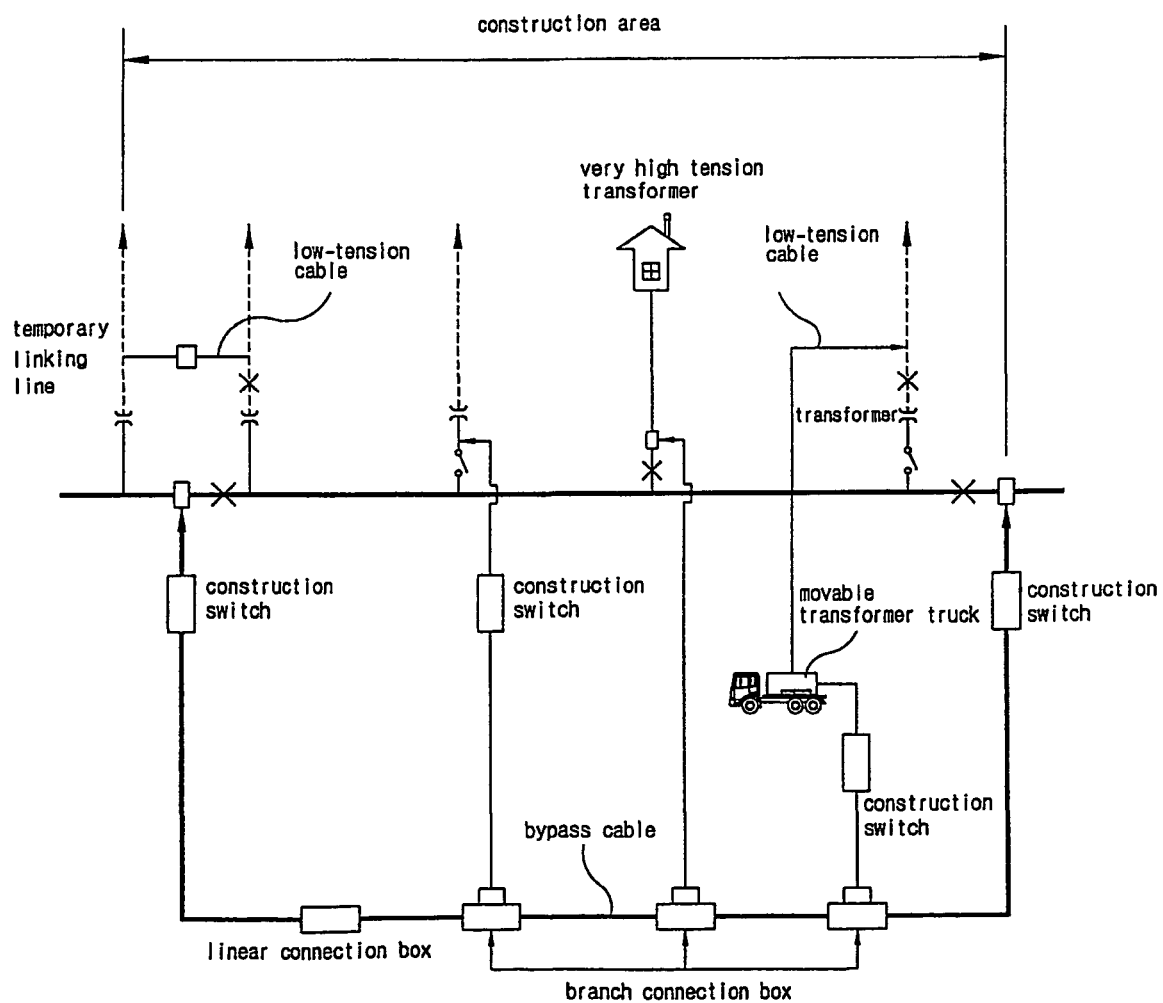
FIG. 16 is a view illustrating a conventional uninterruptible deployment method.

In the thusly firstly contacted fixing device, as shown in FIG. 14c, when the clamp 117 at the rear side is clamped, the clamp 117 moves forward along the screw bar 116, compresses the clamp tub 113 in the forward direction and moves it forward further against the spring 114, thus making the chain 118 more tensile and completely engaging the chain 118 to the surface of the pole by the tensile force of the chain 118.

Figure 12:
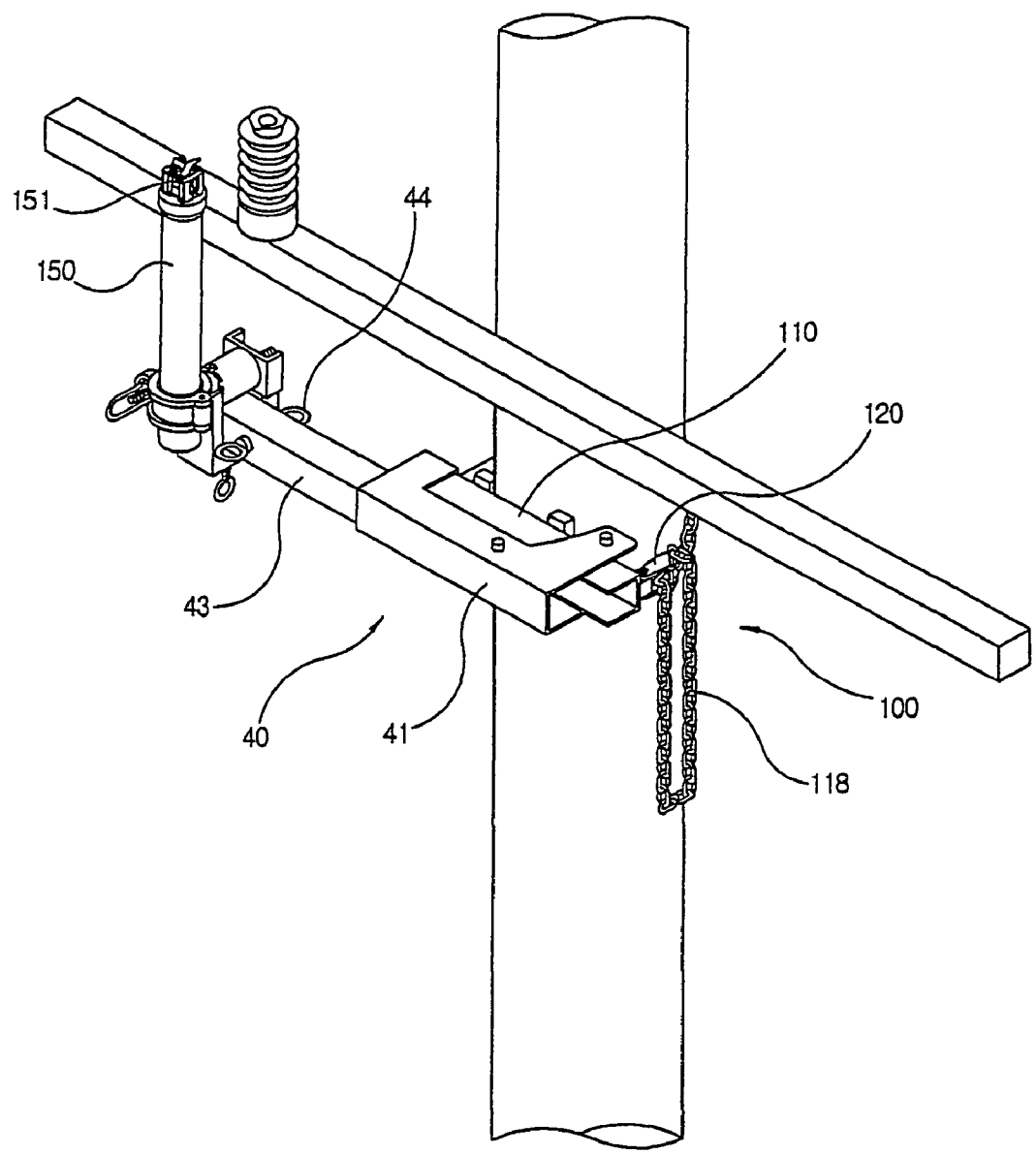
FIG. 12 is a view of an embodiment of the auxiliary cross arm fixing device according to the present invention when it is used for the cross arm for the pin long column.

In the thusly mounted fixing device, as shown in FIG. 12, the auxiliary arm is coupled to the beam 110 by the cross arm supporting plate 41 of the cross arm extension means 40. The wire transfer mechanism is mounted to the auxiliary arm, thus transferring the wire at the upper portion of the cross arm by the stranding roller or directly transferring the wire by directly connecting the wire to the hot line wire grip rings 44 and 44'.

Figure 13:
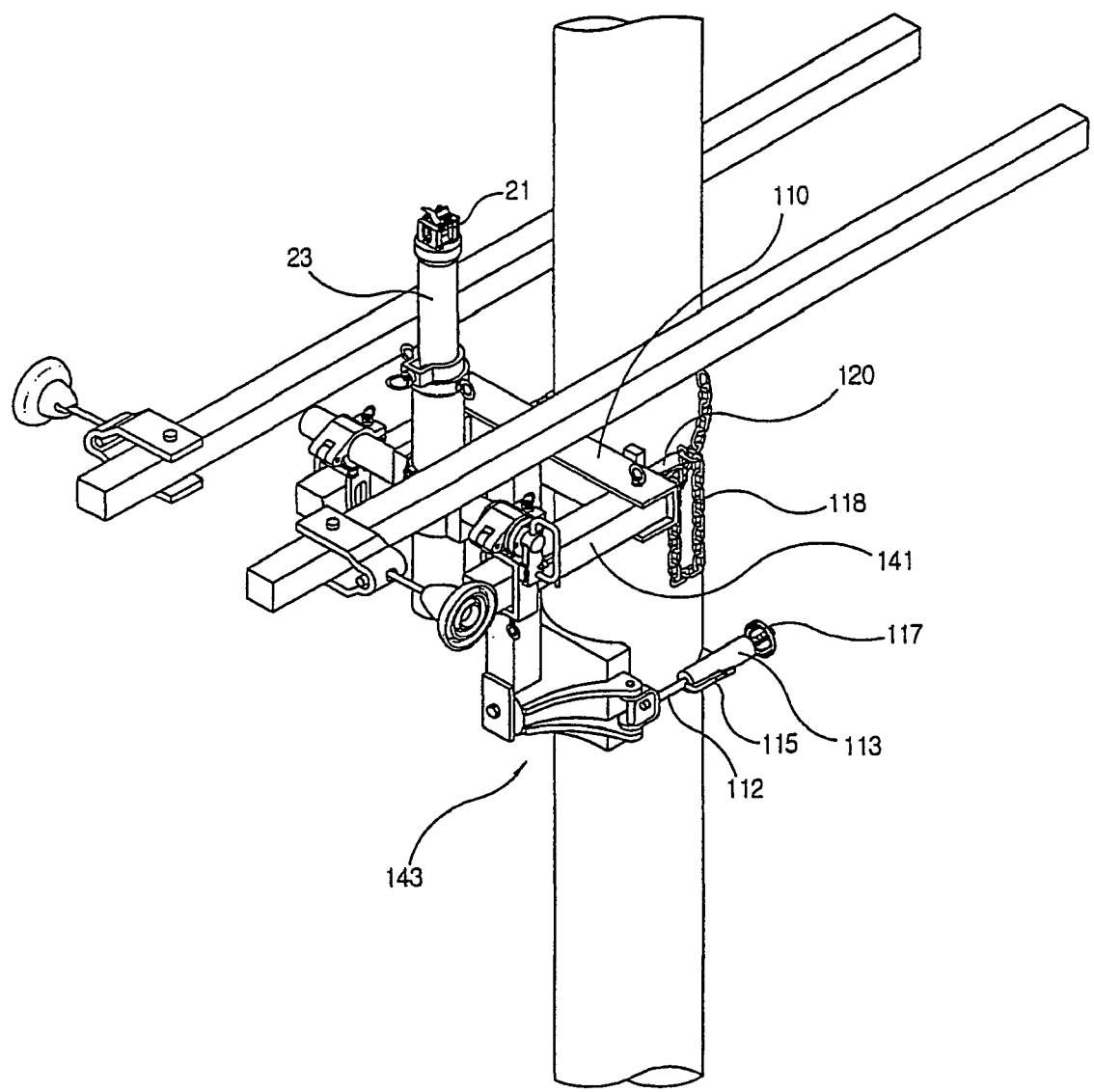
FIG. 13 is a view of another embodiment of the auxiliary cross arm fixing device according to the present invention when it is used for terminal poles and strain poles.

In addition, in the case of the terminal pole and strain pole at which the suspension insulator is installed, as shown in FIG. 13, an auxiliary cross arm 140 of double row type is mounted. By coupling the auxiliary cross arm 140 to the beam 110 of the supporting arm 141, it is constructed in the direction parallel to an existing double row type cross arm for strain poles. Thus, it is possible to relocate a wire by mounting the wire transfer mechanism 20 on the conventional cross arm for strain poles. Particularly, a separate auxiliary supporting means 143 is additionally formed at the lower portion of the auxiliary cross arm 140 for strain poles. Even if the wire transfer means 20 mounted on the auxiliary cross arm 140 has a relatively large tensile force and is heavy, it can be supported without significant deflection.

As described above, according to the present invention, for operations of removal and relocation of wires connected and distributed to each pole and changing of passing area, a wire to be removed and relocated is transferred using the wire transfer mechanism on the poles, and a new wire is mounted on that site. Then, the removed wire acts as a bypass cable of the conventional method for direct transfer, thereby enabling tasks of wire removal, pole removal and relocation and changing of passing area very safely and simply. Since no excessive load switching operation of a large capacity distribution line is performed in order to apply the conventional cable method, an effective and stable distribution line system operation can be carried out correspondingly to the large capacity distributing method. Particularly, as the uninterruptible work can be carried out with respect to the upper end of a distribution line of more than two stages, the quality of power can be improved. Moreover, as the movable transformer truck construction method can be applied, if necessary, only during a transformer replacement operation, the construction cost can be reduced drastically and there is no inconvenience for pedestrians and transit cars due to the mounting of cables, thus minimizing civil disruptions.

What is claimed is:

1. A device for changing a live electric wire on electric poles without cutting off power supply, a wire changing device comprising:
    a fastening unit (10) having a mounting frame for mounting and tightening the wire changing device on a cross-arm of the electric pole,
    a wire replacing unit (20) having a supporting arm for installing and removing the live electric wire and pulling for adjusting the wire tension, and
    an axial-rotating unit (30) having a central arm fixture, an arm coupling and an axial shaft for perpendicularly mounting and rotating the supporting arm within a preset interval, wherein said fastening unit (10) is installed on the axial shaft of said axial-rotating unit (30) and said wire replacing unit (20) is placed on top end of the supporting arm of said axial-rotating unit (30).

2. The device for changing a live electric wire as claimed in claim 1, wherein said fastening unit (10) comprises a pair of the mounting frames (11, 11') formed with a square shape of four flat bar members, an open-able side member for easily inserting and mounting to the cross-arm, and a fastening bolt (12) located at a bottom member for tightening on the cross-arm,
    said wire replacing unit (20) having the supporting arm (23, 23') formed cylindrical shape of two-stage extendable column and made of insulating material, a wire pulling unit having a plurality of rollers (21, 21') with a filly open-able lower member that is mounted at a top of said supporting arm, an adjusting clamp (24) mounted adjacent to a step of two-stage extendable column for adjusting a height or length and tightening the column, and a pair of eye bolts (22, 22') disposed opposite side on the adjusting clamp (24) for connecting ropes, and
    said axial-rotating unit (30) having the central arm fixture (31) formed a flat lateral base at both opposite sides with the arm coupling (31c) between the flat lateral base for tightly mounting the supporting arm, the axial shaft (32) integrally attached to the flat lateral base, an axial coupling (33) having an inner spline (33s), a shaft coupling (34) mounted on the axial shaft (32), a position locker (35) having an outer spine (35s) for mating to the inner spline (33s), and an end flange (35f) integrally attached to the outer spline (35s) for coupling to the axial coupling (33).

3. The device for changing a live electric wire as claimed in claim 1, wherein said the fastening unit (10) having the mounting frame (11) formed a U-shape of three flat bar members integrally attached to a top member of a cylindrical tube (36), an open-able side member for easily inserting and mounting to the cross-arm, a fastening bolt (12) located at a bottom member for tightening on the cross-arm,
    said wire replacing unit (20) having the supporting arm (23) formed a cylindrical shape column and made of insulating material, a wire pulling unit having a plurality of rollers (21, 21') with a fully open-able lower member that is mounted at a top of said supporting arm (23), and
    said axial-rotating unit (30) having the central arm fixture integrally attached to a front member of mounting frame (11), a stopper (37) activated by a resilient force of a spring to limit rotation of the supporting arm (23), an axial shaft (38) rotationally installed inside of the cylindrical tube (36), the arm coupling (39) for tightly mounting the supporting arm (23) and an insulating sealant (39p) disposed between the arm coupling and the supporting arm.

4. The device for changing a live electric wire as claimed in claim 1, the device further comprising an extension unit (40) having a mounting bracket (41) for attaching to a mid of the cross-arm, a mounting foot (42) for sliding into a proximal end of the cross-arm, a pair of bracket pins (45, 45') for securing the attachment to the cross-arm, an extension ann (43) made of insulating material for sliding and inserting into a mounting bracket base for adjusting a extending length and a pair of ring bolts (44) for hooking chains or ropes.

5. The device for changing a live electric wire as claimed in claim 4, the unit further comprising an auxiliary unit (100) having a pair of supporting brackets (111, 111') mounted at both proximal ends of a channel (110), a connecting rod (112) axially coupled to the supporting bracket (111) of one side channel, a sleeve hosing (113) having a side bracket for connecting a chain (118) and a position adjuster (115) at opposite side for elastically locking or unlocking the connecting rod (112) by a spring to adjust a work position, a threaded portion (116) of the connecting rod (112) passing through the sleeve hosing (113) and engaged to a thread wheel (117) for adjusting the work position, a hook (120) having a safety latch (121) and a safety pin hole (122), wherein the chain (118) winds around the electric pole, the chain engaging to the hook (120), tightening the chain and inserting a safety pin (119) into the safety pin hole (122), at the same time, the safety latch (121) securing the engagement of the chain.

\* \* \* \* \*